United States Patent
Malik et al.

(10) Patent No.: US 9,736,279 B2
(45) Date of Patent: *Aug. 15, 2017

(54) HIGHLY RESILIENT PROTOCOL SERVICING IN NETWORK-ATTACHED STORAGE

(71) Applicant: International Business Machines Corporation, Armonk, NY (US)

(72) Inventors: Srikrishan Malik, Pune (IN); Lance W. Russell, Rosanky, TX (US); Rong Zeng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,658

(22) Filed: Jun. 7, 2016

(65) Prior Publication Data

US 2016/0294992 A1   Oct. 6, 2016

Related U.S. Application Data

(63) Continuation of application No. 13/927,433, filed on Jun. 26, 2013, now Pat. No. 9,369,525.

(51) Int. Cl.
*G06F 15/173* (2006.01)
*H04L 29/14* (2006.01)
(Continued)

(52) U.S. Cl.
CPC ........ *H04L 69/40* (2013.01); *G06F 17/30197* (2013.01); *H04L 12/1868* (2013.01);
(Continued)

(58) Field of Classification Search
CPC ... H04L 69/40; H04L 12/1868; H04L 47/125; H04L 43/08; H04L 43/0817;
(Continued)

(56) References Cited

U.S. PATENT DOCUMENTS

| | | | |
|---|---|---|---|
| 6,625,750 B1 | 9/2003 | Duso et al. | |
| 7,164,656 B2 * | 1/2007 | Foster | H04L 49/357 370/235 |

(Continued)

FOREIGN PATENT DOCUMENTS

| | | |
|---|---|---|
| JP | 2009025965 A | 2/2009 |
| JP | 2012073773 A | 4/2012 |

OTHER PUBLICATIONS

International Application No. PCT/CA2014/050490; International Search Report and Written Opinion dated Sep. 9, 2014, 7 pages.

(Continued)

*Primary Examiner* — Richard G Keehn
(74) *Attorney, Agent, or Firm* — Stephen R. Tkacs; Stephen J. Walder, Jr.; Randall J. Bluestone

(57) ABSTRACT

A mechanism is provided a data processing system for protocol servicing in network-attached storage. A protocol service executing in the data processing system in a clustered file system establishes a high priority recovery thread. The high priority recovery thread monitors health counters that count total requests in and total requests out for a client accessing a network-attached storage device via the protocol service. The high priority recovery thread determines a category of health of the protocol service based on the health counters. The mechanism takes corrective action based on the category of health of the protocol service.

20 Claims, 2 Drawing Sheets

(51) Int. Cl.

| | | |
|---|---|---|
| *H04W 76/04* | (2009.01) | |
| *H04W 72/04* | (2009.01) | |
| *H04L 12/26* | (2006.01) | |
| *H04W 52/02* | (2009.01) | |
| *H04L 29/08* | (2006.01) | |
| *G06F 17/30* | (2006.01) | |
| *H04L 12/18* | (2006.01) | |
| *H04L 12/803* | (2013.01) | |

(52) U.S. Cl.
CPC .......... *H04L 43/08* (2013.01); *H04L 43/0817* (2013.01); *H04L 47/125* (2013.01); *H04L 67/1097* (2013.01); *H04W 52/0216* (2013.01); *H04W 72/0406* (2013.01); *H04W 76/048* (2013.01); *Y02B 60/50* (2013.01)

(58) Field of Classification Search
CPC ......... H04L 67/1097; G06F 17/30197; H04W 76/048; H04W 72/0406; H04W 52/0216
See application file for complete search history.

(56) References Cited

U.S. PATENT DOCUMENTS

| | | | |
|---|---|---|---|
| 7,167,912 B1* | 1/2007 | Dhingra | H04L 43/10 709/223 |
| 7,203,862 B2 | 4/2007 | Fujimoto | |
| 7,356,531 B1 | 4/2008 | Popelka et al. | |
| 7,426,653 B2 | 9/2008 | Hu et al. | |
| 7,447,933 B2 | 11/2008 | Matsunami et al. | |
| 7,487,390 B2 | 2/2009 | Saika | |
| 7,516,181 B1 | 4/2009 | Du et al. | |
| 7,693,892 B2 | 4/2010 | Koarashi et al. | |
| 7,822,719 B1 | 10/2010 | Noveck | |
| 7,886,050 B2 | 2/2011 | Raja et al. | |
| 7,962,915 B2 | 6/2011 | Eshel et al. | |
| 8,117,487 B1* | 2/2012 | Raut | G06F 11/004 709/224 |
| 8,122,284 B2 | 2/2012 | Taylor et al. | |
| 8,260,926 B2 | 9/2012 | Narayana et al. | |
| 8,296,599 B1 | 10/2012 | Boyer et al. | |
| 2003/0140149 A1 | 7/2003 | Marejka et al. | |
| 2003/0196148 A1* | 10/2003 | Harrisville-Wolff | H04L 12/2602 714/47.1 |
| 2004/0249904 A1* | 12/2004 | Moore | H04L 29/06 709/216 |
| 2006/0212453 A1 | 9/2006 | Eshel et al. | |
| 2007/0180305 A1 | 8/2007 | Fujimoto | |
| 2007/0244962 A1 | 10/2007 | Laadan et al. | |
| 2009/0077233 A1* | 3/2009 | Kurebayashi | G06F 9/4843 709/224 |
| 2011/0087899 A1* | 4/2011 | Fetik | G06F 21/552 713/193 |
| 2012/0254443 A1* | 10/2012 | Ueda | H04L 67/1008 709/226 |
| 2012/0259819 A1* | 10/2012 | Patwardhan | G06F 17/30079 707/674 |
| 2012/0259820 A1 | 10/2012 | Patwardhan | |
| 2013/0247066 A1* | 9/2013 | Dodge | G06F 9/4881 718/104 |
| 2014/0173092 A1* | 6/2014 | Uluderya | H04L 67/1008 709/224 |
| 2014/0258521 A1* | 9/2014 | English | G06F 9/5083 709/224 |
| 2015/0074252 A1* | 3/2015 | Rattner | H04L 41/0816 709/221 |

OTHER PUBLICATIONS

U.S. Appl. No. 13/927,433.
U.S. Appl. No. 13/929,211.
U.S. Appl. No. 15/090,046.
Adam, Michael et al., "Clustered NAS for Everyone Clustering Samba with CTDB", NLUUG Spring Conference 2009, May 7, 2009, 15 pages.
Gobioff, Howard et al., "Security for Network Attached Storage Devices", School of Computer Science, Carnegie Mellon University, Pittsburgh, PA, Oct. 23, 1997, 20 pages.
Guijarro, Manuel et al., "Experience and Lessons learnt from running High Availability Databases on Network Attached Storage", IOP Publishing Ltd, International Conference on Computing in High Energy and Nuclear Physics (CHEP'07), Journal of Physics: Conference Series 119, No. 4, Jul. 2008, 10 pages.
Shepler, S. et al., "Network File System (NFS) version 4 Protocol", IETF Network Working Group, RFC 3530, Apr. 2003, 249 pages.

* cited by examiner

HIGHLY RESILIENT PROTOCOL SERVICING IN NETWORK-ATTACHED STORAGE

BACKGROUND

The present application relates generally to an improved data processing apparatus and method and more specifically to mechanisms for highly resilient protocol servicing in network-attached storage.

A clustered file system is a file system that is shared by being simultaneously mounted on multiple servers. Clustered file systems can provide features like location-independent addressing and redundancy which improve reliability or reduce the complexity of the other parts of the cluster. Parallel file systems area type of clustered file system that spread data across multiple storage nodes, usually for redundancy or performance.

Network-attached storage (NAS) provides both storage and a file system, like a shared disk file system on top of a storage area network (SAN). NAS is file-level computer data storage connected to a computer network providing data access to a heterogeneous group of clients. NAS not only operates as a file server, but is specialized for this task either by its hardware, software, or configuration of those elements. NAS is often manufactured as a computer appliance, a specialized computer built from the ground up for storing and serving files, rather than simply a general purpose computer being used for the role.

NAS systems are networked appliances which contain one or more hard drives, often arranged into logical, redundant storage containers or redundant array of independent disks (RAID). Network-attached storage removes the responsibility of file serving from other servers on the network. They typically provide access to files using network file sharing protocols such as network file system (NFS) or server message block/common Internet file system (SMB/CIFS).

SUMMARY

In one illustrative embodiment, a method, in a data processing system, is provided for protocol servicing in network-attached storage. The method comprises establishing, by a protocol service executing in the data processing system in a clustered file system, a high priority recovery thread. The method further comprises monitoring, by the high priority recovery thread, health counters that count total requests in and total requests out for a client or clients accessing a network-attached storage device via the protocol service. In addition, the health counters may monitor specific types of protocol operations such as file opens, file locks, etc. The method further comprises determining, by the high priority recovery thread, a category of health of the protocol service based on the health counters. The method further comprises taking corrective action based on the category of health of the protocol service.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
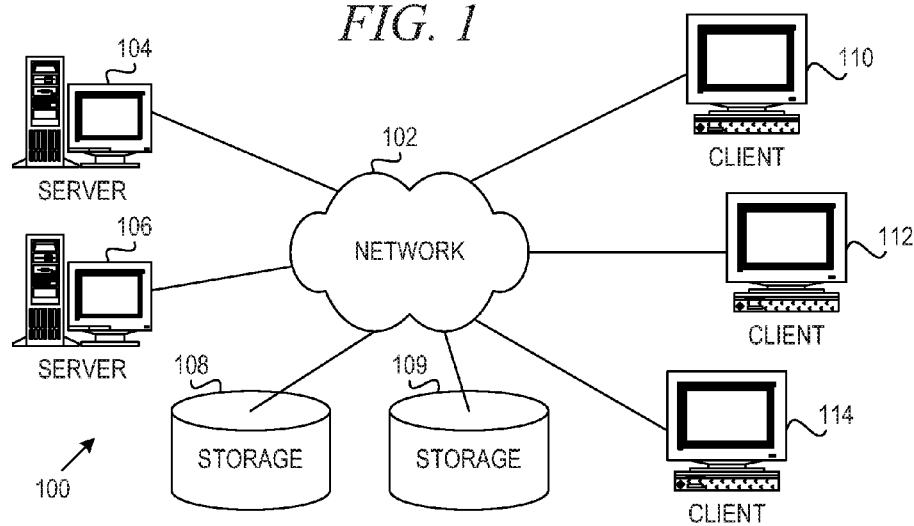
FIG. 1 depicts a pictorial representation of an example clustered file system in which aspects of the illustrative embodiments may be implemented.

The illustrative embodiments provide a mechanism for highly resilient protocol servicing in network-attached storage (NAS). In a current approach, NAS devices monitor the health of their protocol services, usually NFS and/or CIFS, and take corrective action when they detect service degradation. The NAS generally performs monitoring by constructing a minimal protocol operation and sending that operation to the device. In NFS, the minimal protocol operation may be a NULL operation, for example, if the NAS does not receive a response within a certain period of time within a certain number of tries, the NAS deems the service unresponsive and takes corrective action. The corrective action typically involves completely restarting the service.

There are several problems with the current approach that mainly surface under heavy protocol load conditions. Under these circumstances, network processing of a particular request (i.e., the NULL health operation) may be delayed even though overall protocol processing is proceeding at a heavy rate. Note also that the monitor adds to the protocol load, which exacerbates the situation. That is, monitoring itself can contribute to the node being deemed unhealthy.

Also note that no matter how one adjusts the time interval that the monitor waits, there will always be a load level at which the latency of the response exceeds the time interval. One cannot adjust the approach to completely eliminate the case where the monitor incorrectly concludes that the service is unresponsive.

In addition, restarting the service in these conditions causes further problems. When the service is restarted, all clients are disrupted and respond by retransmitting their outstanding requests. This increases the total protocol load and often swamps the newly restarted service leading to a cycle of restart/re-transmission/restart/re-transmission.

The mechanism of the illustrative embodiments moves the task of service monitoring from an outside source sending protocol operations to within the protocol service itself. Internally, the protocol keeps track of whether requests are being processed and, if so, at what rate, whether requests of a particular type or from a particular client are stalled, etc. Taking the monitoring data into account, the service can then categorize its health and publicize its condition. In an example embodiment, the service may categorize its health as green, yellow, or red. Depending on this condition the service may be restarted, relocated, or left unmodified. These corrective actions can be taken by an external source or by the service itself.

The mechanism of the illustrative embodiments has several advantages over the current state of the art. The mechanism is not dependent on an external network request and does not add to protocol load. If protocol requests are being processed, that is known definitively. The service will never be characterized as unresponsive simply because the latency of particular requests or types of requests has increased. The mechanism will never restart a service under heavy load if reasonable forward progress is being made. The service can monitor state internally, which would be difficult or impossible to monitor externally. Examples include if a particular client's requests are stalled or if a particular operation is not progressing. This allows more precise and granular corrective actions. For instance, a stalled client can be migrated to another node rather than restarting the entire service. Problems with a particular type of request can indicate implementation errors in the protocol.

Figure 2:
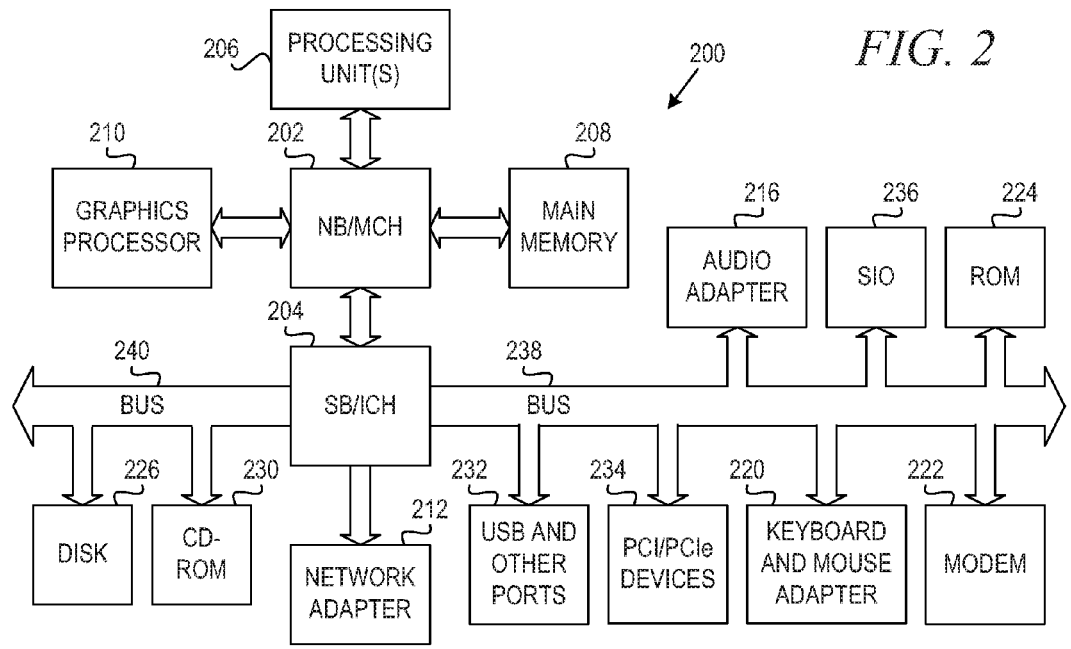
FIG. 2 is a block diagram of an example data processing system in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example clustered file system in which aspects of the illustrative embodiments may be implemented. Clustered file system 100 may include a network of computers in which aspects of the illustrative embodiments may be implemented. The clustered file system 100 contains at least one network 102, which is the medium used to provide communication links between various devices and computers connected together within clustered file system 100. The network 102 may, include connections, such as wire, wireless communication links, or fiber optic cables.

In the depicted example, server 104 and server 106 are connected to network 102 along with storage units 108, 109. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Clustered file system 100 may include additional servers, clients, and other devices not shown.

In one embodiment, storage units 108, 109 are network-attached storage (NAS) device, and servers 104, 106 allow clients 110, 112, 114 to access the NAS devices. Storage and access may be combined on one node. The protocol service is a software layer existing on the server and client where the server provides the service and where the client accesses the service. In the depicted example, servers 104, 106 provide the protocol service to clients 110, 112, 114 to access NAS devices. In one illustrative embodiment of the clustered file system 100, any of the servers 104, 106 can serve any of the clients 110, 112, 114 to provide access to any of the NAS devices 108, 109.

In the depicted example, clustered file system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System P® computer system, running the Advanced Interactive Executive (AIX®) operating system or the LAMA operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
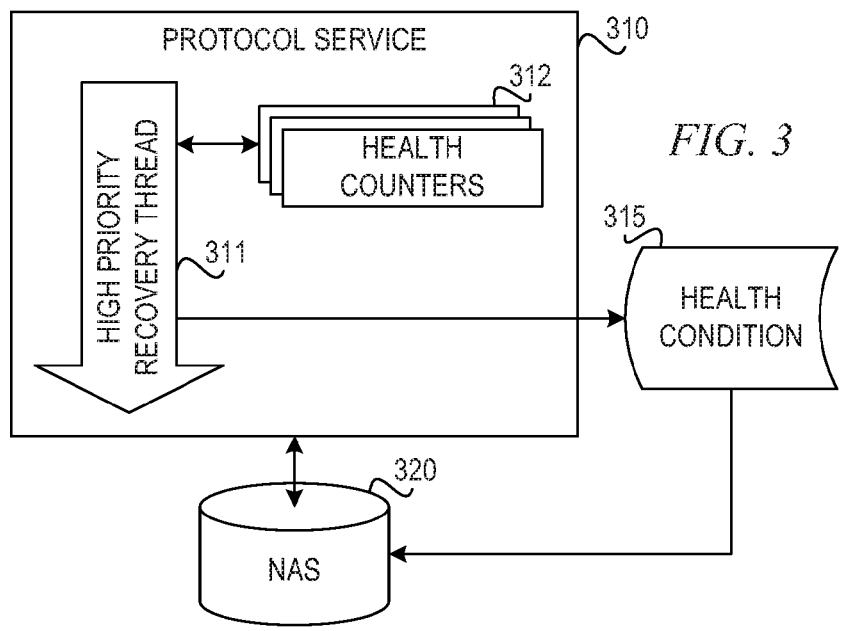
FIG. 3 is a block diagram illustrating a protocol service in accordance with an illustrative embodiment.

FIG. 3 is a block diagram illustrating a protocol service in accordance with an illustrative embodiment. Protocol service 310 establishes a high priority recovery thread 311. If the service is capable of any processing, then high priority recovery thread 311 executes first. Protocol service 310 establishes health counters 312, which count total protocol requests in and total protocol requests out with respect to NAS device 320. Protocol service 310 establishes health counters 312 for each protocol operation type and for each client.

Recovery thread 311 monitors health counters 312 on a periodic basis and keeps track of forward progress and rates. Recovery thread 311 then uses this data to categorize the health of protocol service 310. In one example embodiment, recovery thread 311 may categorize the health of the service as green, yellow, or red. For example, recovery thread 311 may categorize the health of the service as green if the health counters 312 indicate that forward progress is being made with protocol requests at an acceptable rate. Recovery thread 311 may categorize the health of the service as red if the health counters 312 indicate that no total forward progress is being made. Recovery thread 311 may categorize the health of the service as yellow if the health counters 312 indicate that forward progress is being made but with heavy protocol load conditions or no progress is being made on certain protocol operations.

High priority recovery thread 311 publicizes the category of the health of the service as health condition 315. In one example embodiment, recovery thread 311 may publicize health condition 315 by writing the health condition 315 to cluster file system. In an alternative embodiment, recovery thread 311 may multicast health condition 315 on the network or process health condition 315 internally within protocol service 310.

If the health condition 315 is green, then protocol service 310 and NAS device 320 do not take corrective action. If the health condition 315 is red, then protocol service 310 restarts. In one example embodiment, this only occurs when no total forward progress is being made, i.e., the service in total is thrashing. An outside source (not shown) may initiate the restart or protocol service 310 may initiate its own restart. If the health condition 315 is yellow, then protocol service 310 my take a variety of actions, such as moving some or all of the clients.

As will be appreciated by one skilled in the art, the present invention may be embodied as a system, method, or computer program product. Accordingly, aspects of the present invention may take the form of an entirety hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4:
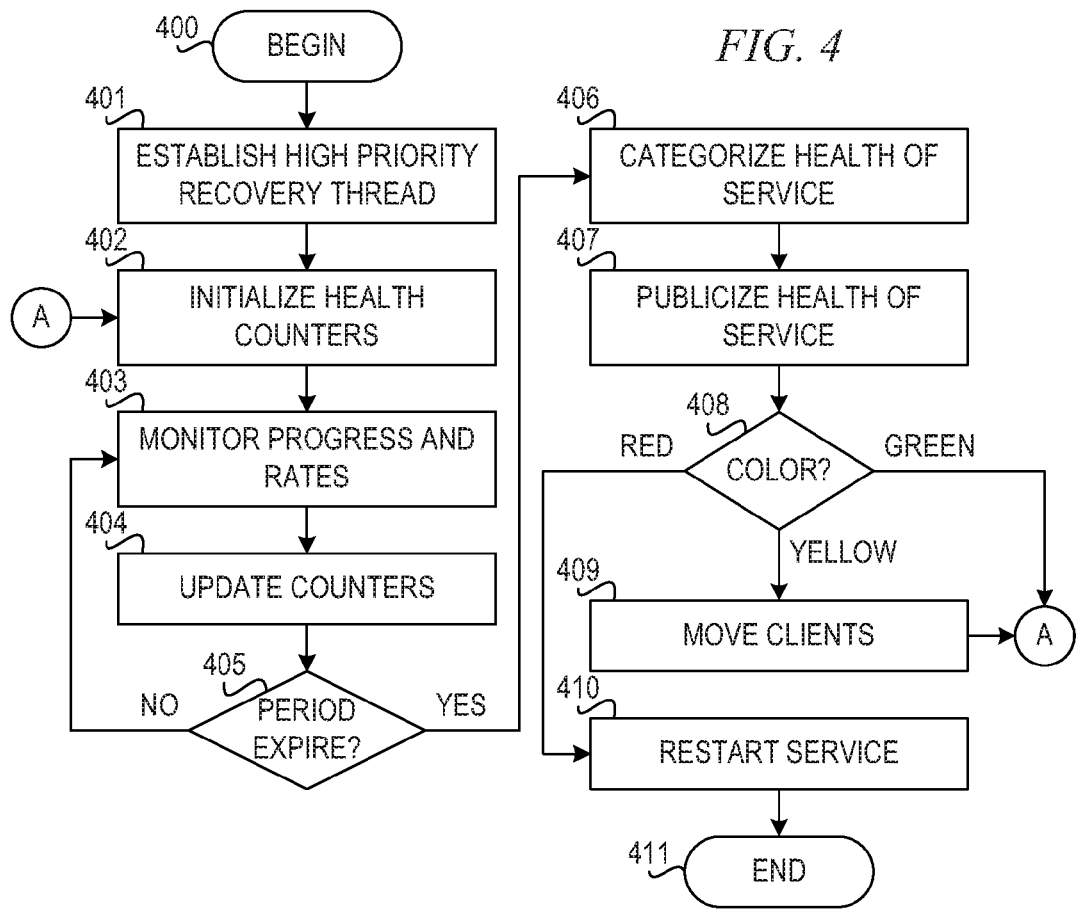
FIG. 4 is a flowchart illustrating operation of a protocol service in accordance with an illustrative embodiment.

FIG. 4 is a flowchart illustrating operation of a protocol service in accordance with an illustrative embodiment. Operation begins (block 400), and the protocol service establishes a high priority recovery thread (block 401). The high priority recovery thread initializes health counters (block 402).

The high priority recovery thread then monitors progress and rates (block 403) and updates the health counters (block 404). The high priority recovery thread then determines whether a predetermined period of time expires (block 405). If the period does not expire, operation returns to block 403 to continue to monitor progress and rates.

If the period expires in block 405, the high priority recovery thread categorizes the health of the service (block 406) and publicizes the health of the service (block 407). For example, the recovery thread may categorize the health of the service as green if the health counters indicate that forward progress is being made with protocol requests at an acceptable rate. The recovery thread may categorize the health of the service as red if the health counters indicate that no total forward progress is being made. The recovery thread may categorize the health of the service as yellow if the health counters indicate that forward progress is being made but with heavy protocol load conditions.

Thus, in the illustrative embodiment, the protocol service determines the color category of the health of the service (block 408). If the health of the service is categorized as green, operation returns to block 402 to initialize the health counters and continue monitoring.

If the health of the service is categorized as yellow in block 408, the protocol service moves clients to another server (block 409), and operation returns to block 402 to initialize the health counters and continue monitoring.

If the health of the service is categorized as red in block 408, the protocol service restarts (block 410). Thereafter, operation ends (block 411).

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including hut not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for protocol servicing in network-attached storage, the method comprising:
    monitoring, by a protocol service executing in the data processing system in a clustered file system, health counters that count total requests in and total requests out for a client accessing a network-attached storage device via the protocol service;
    determining, by the protocol service, a category of health of the protocol service based on the health counters; and
    taking corrective action based on the category of health of the protocol service.

2. The method of claim 1, wherein taking corrective action comprises moving at least one client to another protocol service responsive to the category of health of the protocol service being a first category.

3. The method of claim 1, wherein taking corrective action comprises restarting the protocol service responsive to the category of health of the protocol service being a second category.

4. The method of claim 3, wherein the network-attached storage device restarts the protocol service.

5. The method of claim 1, further comprising taking no corrective action responsive to the category of health of the protocol service being a third category.

6. The method of claim 1, further comprising:
    publicizing the category of health of the protocol service.

7. The method of claim 6, wherein publicizing the category of health of the protocol service comprises writing the category of health of the protocol service to the cluster file system.

8. The method of claim 6, wherein publicizing the category of health of the protocol service comprises multicasting the category of health of the protocol service.

9. The method of claim 1, wherein monitoring health counters comprises monitoring health counters for each client accessing the network-attached storage device via the protocol service.

10. The method of claim 1, wherein monitoring health counters comprises monitoring health counters for each protocol operation type.

11. A computer program product comprising a non-transitory computer readable storage medium having a computer readable program stored therein, wherein the computer readable program, when executed on a computing device, causes the computing device to:
    monitor, by a protocol service executing in the data processing system in a clustered file system, health counters that count total requests in and total requests out for a client accessing a network-attached storage device via the protocol service;
    determine, by the protocol service, a category of health of the protocol service based on the health counters; and
    take corrective action based on the category of health of the protocol service.

12. The computer program product of claim 11, wherein taking corrective action comprises moving at least one client to another protocol service responsive to the category of health of the protocol service being a first category.

13. The computer program product of claim 11, wherein taking corrective action comprises restarting the protocol service responsive to the category of health of the protocol service being a second category.

14. The computer program product of claim 13, wherein the network-attached storage device restarts the protocol service.

15. The computer program product of claim 11, wherein the computer readable program further causes the computing device to:
    take no corrective action responsive to the category of health of the protocol service being a third category.

16. The computer program product of claim 11, wherein the computer readable program further causes the computing device to:
    publicizing the category of health of the protocol service.

17. The computer program product of claim 16, wherein publicizing the category of health of the protocol service comprises writing the category of health of the protocol service to the cluster file system.

18. The computer program product of claim 16, wherein publicizing the category of health of the protocol service comprises multicasting the category of health of the protocol service.

19. The computer program product of claim 11, wherein monitoring health counters comprises monitoring health counters for each client accessing the network-attached storage device via the protocol service.

20. An apparatus, comprising:
    a processor; and
    a memory coupled to the processor, wherein the memory comprises instructions which, when executed by the processor, cause the processor to:
    monitor, by a protocol service executing in the data processing system in a clustered file system, health counters that count total requests in and total requests out for a client accessing a network-attached storage device via the protocol service;

determine, by the protocol service, a category of health of the protocol service based on the health counters; and take corrective action based on the category of health of the protocol service.

\* \* \* \* \*